US009513425B2

(12) United States Patent
Chou et al.

(10) Patent No.: US 9,513,425 B2
(45) Date of Patent: Dec. 6, 2016

(54) BACKLIGHT MODULE INCLUDING A QUANTUM DOT ENHANCEMENT FILM AND DISPLAY DEVICE USING THE SAME

(71) Applicant: InnoLux Corporation, Miao-Li County (TW)

(72) Inventors: Mei-Fan Chou, Miao-Li County (TW); Tun-Chuan Chen, Miao-Li County (TW); Chun-Wei Liu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/456,175

(22) Filed: Aug. 11, 2014

(65) Prior Publication Data

US 2015/0070934 A1 Mar. 12, 2015

(30) Foreign Application Priority Data

Sep. 6, 2013 (TW) .............................. 102132146 A

(51) Int. Cl.
*F21V 8/00* (2006.01)
*F21V 5/00* (2015.01)

(52) U.S. Cl.
CPC ........... *G02B 6/0051* (2013.01); *G02B 6/0088* (2013.01)

(58) Field of Classification Search
CPC .... G02B 6/0051; G02B 6/0088; G02B 6/0093
USPC .............................. 362/611–613; 349/58, 61
See application file for complete search history.

(56) References Cited

U.S. PATENT DOCUMENTS

| 6,502,945 | B2* | 1/2003 | Kim et al. | 362/633 |
| 8,622,600 | B2 | 1/2014 | Cheng et al. | |
| 2008/0018823 | A1* | 1/2008 | Wang | 349/58 |
| 2011/0309325 | A1* | 12/2011 | Park et al. | 257/13 |
| 2013/0135898 | A1* | 5/2013 | Horikawa et al. | 362/609 |
| 2013/0286327 | A1* | 10/2013 | Huang | 349/65 |
| 2014/0332829 | A1* | 11/2014 | Fan | 257/89 |

FOREIGN PATENT DOCUMENTS

| CN | 201066421 | 5/2008 |
| CN | 101975371 | 2/2011 |

(Continued)

OTHER PUBLICATIONS

Taiwanese language office action dated Mar. 30, 2015, issued in application No. TW 102132146.

(Continued)

*Primary Examiner* — Joseph L Williams
(74) *Attorney, Agent, or Firm* — McClure, Qualey & Rodack, LLP

(57) ABSTRACT

The invention provides a backlight module including: a planar illuminant portion having a first surface and emitting light from the first surface; an optical film assembly adhered to the first surface of the planar illuminant portion and having a bottom optical film and at least an upper optical film layered above the bottom optical film; and a ring-shaped frame surrounding the planar illuminant portion and having a first extension portion extending along a direction parallel to the first surface, wherein the bottom optical film extends toward the ring-shaped frame more than the upper optical film such that the first extension portion covers at least an edge of the bottom optical film.

7 Claims, 4 Drawing Sheets

(56) References Cited

FOREIGN PATENT DOCUMENTS

| CN | 102297369 | 12/2011 |
|---|---|---|
| CN | 202521397 | 11/2012 |
| CN | 203069818 U | 7/2013 |
| TW | M350728 | 2/2009 |

OTHER PUBLICATIONS

Chinese language office action dated Apr. 5, 2016, issued in application No. CN 201310403657.8.

* cited by examiner

BACKLIGHT MODULE INCLUDING A QUANTUM DOT ENHANCEMENT FILM AND DISPLAY DEVICE USING THE SAME

CROSS REFERENCE TO RELATED APPLICATIONS

This Application claims priority of Taiwan Patent Application No. 102132146, filed on Sep. 6, 2013, the entirety of which is incorporated by reference herein.

BACKGROUND OF THE INVENTION

1. Field of the Invention

The present invention relates to a backlight module and a display device, and in particular to a backlight module and a display device capable of preventing blue light leaks from the edge of the display.

2. Description of the Related Art

To raise the color saturation of a liquid crystal display for better image quality, a manufacturer in this field has proposed an approach which applies a film called Quantum Dot Enhancement Film (QDEF) to a backlight module consisting of blue LEDs. Quantum dot enhancement film has a plurality of quantum dot phosphors of different sizes to convert the incident blue light to light having different wavelengths. Thereby, the spectrum of white light mixed from the light having different wavelengths is wider such that the color saturation of the display is higher.

In the backlight module, four edges of the quantum dot enhancement film formed on the surface of a light guiding plate should keep a predetermined distance away from the frame surrounding the light guiding plate to prevent compressive deformation due to thermal expansion. However, a portion of blue light is emitted from the gap without passing through the quantum dot enhancement film such that the user could become conscious of blue light leaks from the four edges of the display.

In view of this problem, the invention provides a backlight module and a display device reducing blue light leaks from the edges of the display for a better visual experience.

BRIEF SUMMARY OF THE INVENTION

A detailed description is given in the following embodiments with reference to the accompanying drawings.

The invention provides a backlight module including: a planar illuminant portion having a first surface and emitting light from the first surface; an optical film assembly adhered to the first surface of the planar illuminant portion and having a bottom optical film and at least an upper optical film layered above the bottom optical film; and a ring-shaped frame surrounding the planar illuminant portion and having a first extension portion extending along a direction parallel to the first surface, wherein the bottom optical film extends toward the ring-shaped frame more than the upper optical film such that the first extension portion covers at least an edge of the bottom optical film.

In the above backlight module, the planar illuminant portion includes: a light guiding plate; and a plurality of light sources arranged along at least one edge of the light guiding plate which guides light emitted from the plurality of light sources to the first surface, wherein the ring-shaped frame has a second extension portion, wherein there is a gap between the bottom optical film and second extension portion in the direction parallel to the first surface.

The above backlight module further includes: a shielding pad disposed in the second extension portion and extending along the direction parallel to the first surface to stretch across the gap and cover at least an edge of the bottom optical film.

In the above backlight module, the ring-shaped frame has a white surface for reflecting light back to the bottom optical film or the light guiding plate.

In the above backlight module, the plurality of light sources are blue LEDs. The bottom optical film is a quantum dot enhancement film. The upper optical film is a diffusion film or a micro-lens brightness enhancement film.

The above backlight module further includes: a printed circuit board adhered to a second surface of the planar illuminant portion which is opposite to the first surface, for driving the plurality of light sources.

The invention also provides a display device, including: a display panel; a planar illuminant portion emitting light toward the display panel; an optical film assembly adhered to a surface, facing the display panel, of the planar illuminant portion and having a bottom optical film and at least one upper optical film layered above the bottom optical film; and a ring-shaped frame surrounding the planar illuminant portion and having an extension portion for supporting the display panel, the extension portion extending along a direction parallel to the display panel, wherein the bottom optical film extends toward the ring-shaped frame more than the upper optical film such that the extension portion covers at least one edge of the bottom optical film.

In the above display device, the planar illuminant portion emits blue light, and the bottom optical film is a quantum dot enhancement film for converting the blue light into multiple-color-mixed-light which is close to white light.

According to the above backlight module and display device, blue light leaks from edges of the display can be prevented to improve the visual experience.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
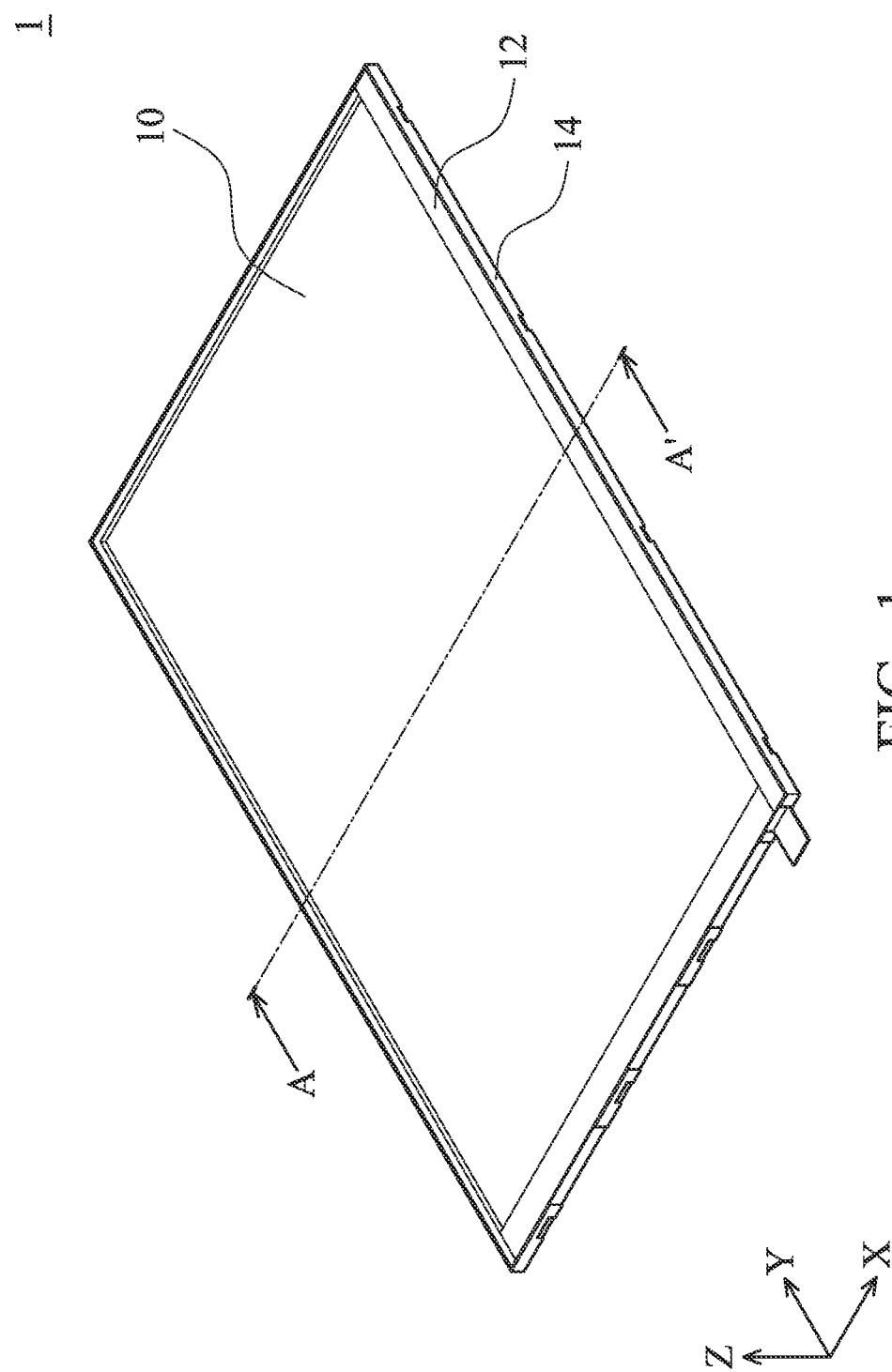
FIG. 1 is a three-dimensional diagram showing a backlight module of a liquid crystal display.

FIG. 1 is a three-dimensional diagram showing a backlight module of a liquid crystal display. As shown in FIG. 1, basically three portions can be seen from the appearance of the backlight module 1: a planar illuminant portion 10, a frame portion 12, and a housing portion 14. The planar illuminant portion 10 emits planar light toward the +Z direction. The frame portion 12 surrounds the planar illuminant portion 10 to restrict the X-directional position and the Y-directional position of the planar illuminant portion 10. The housing portion 14 contains the planar illuminant portion 10 and the frame portion 12, and functions with the frame portion 12 to restrict the Z-directional position of the planar illuminant portion 10.

Figure 2:
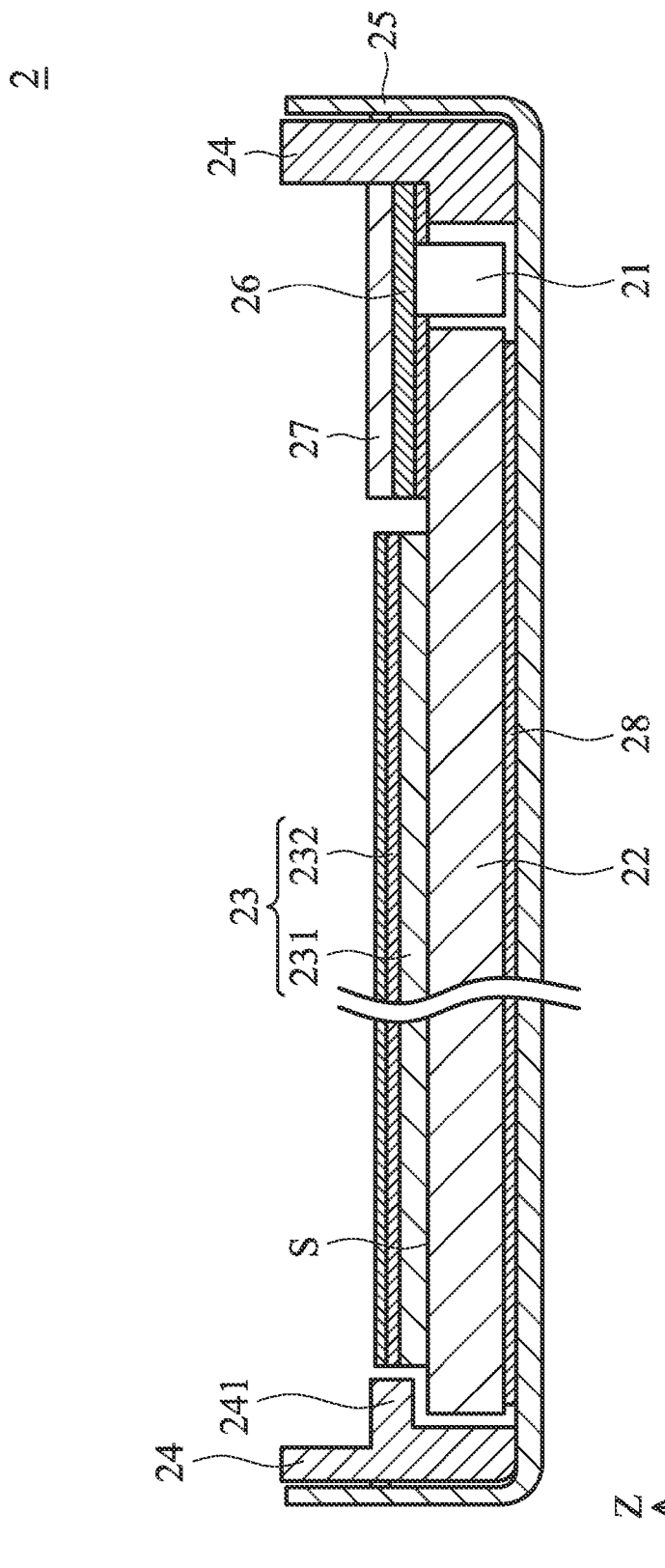
FIG. 2 is a section view of a conventional backlight module.

FIG. 2 is a section view of a conventional backlight module. When a convention backlight module is viewed from the A-A' section of FIG. 1, as shown in FIG. 2, the backlight module 2 comprises an LED light source 21, a light guiding plate 22, an optical film assembly 23, a ring-shaped frame 24, a bezel 25, a printed circuit board 26, a fixation pad 27, and a reflection film 28. The LED light source 21, the light guiding plate 22, and the optical film assembly 23 correspond to the planar illuminant portion 10 shown in FIG. 1; the ring-shaped frame 24 and the fixation pad 27 correspond to the frame portion 12 shown in FIG. 1; and the bezel 25 correspond to the housing portion 14 shown in FIG. 1.

The LED light source 21 comprises a plurality of blue light LED arranged along the Y direction, and emits blue light toward the −X direction. The light guiding plate 22 is a rectangular plane structure which guides the blue light emitted from the LED light source 21 and reflects the light repeatedly therein. The diffused light is then converted into uniform planar light and emitted from a first surface S along the +Z direction. The optical film assembly 23 is adhered on the first surface S of the light guiding plate 22. The optical film assembly 23 comprises a bottom optical film 231, and two upper optical films 232 layered above the bottom optical film 231. The bottom optical film 231 is a quantum dot enhancement film for converting blue light into multiple-color-mixed-light which is close to white light. The two upper optical films 232 can be diffusion film, micro-lens brightness enhancement film, etc.

The ring-shaped frame 24 has two sides extending along the Y direction to restrict the X-directional position of the LED light source 21 and the light guiding plate 22, and the other sides extending along the X direction to restrict the Y-directional position of the LED light source 21 and the light guiding plate 22. The ring-shaped frame 24 further has an extension portion 241 extending toward the +X direction. The bezel 2 has a "C" shaped cross section in the XZ plane to wrap the LED light source 21, the light guiding plate 22, and the ring-shaped frame 24 therein. The bottom surface of the bezel 25 further functions with the extension portion 241 to restrict the Z-directional position of the light guiding plate 22.

The printed circuit board 26 comprises a circuit for driving the LED light source 21, and is adhered across the ring-shaped frame 24 and the light guiding plate 22. The fixation pad 27 overlaps on the printed circuit board 26 to restrict the Z-directional position of the light guiding plate 22. The extension portion 241 of the ring-shaped frame 24 and the +Z directional surface of the fixation pad 27 are further used as a platform to support and adhere the display panel (not shown) thereon. The reflection film 28 is adhered between the −Z-directional surface of the light guiding plate 22 and the +Z-directional surface of the bezel 25 for reflecting light to the +Z direction.

When the structure shown in FIG. 2 is assembled, the ring-shaped frame 24 and the fixation pad 27 are used to fix the light guiding plate and then the optical film assembly 23 is placed on the +Z directional surface of the light guiding plate 22. A gap must be preserved between the optical film assembly 23 and the extension portion 241 of the ring-shaped frame 24, and between the optical film assembly 23 and the fixation pad 27 to prevent compressive deformation due to thermal expansion. However, the gap causes blue light leaks. From FIG. 2, it can be seen that the regions of the light guiding plate 22 at the gap positions are not covered by any one of the extension portion 241, the optical film assembly 23 and fixation pad 27. Therefore, blue light not passing through the quantum dot enhancement film 331 will be seen by the human eye such that visual experience becomes worse.

Figure 3:
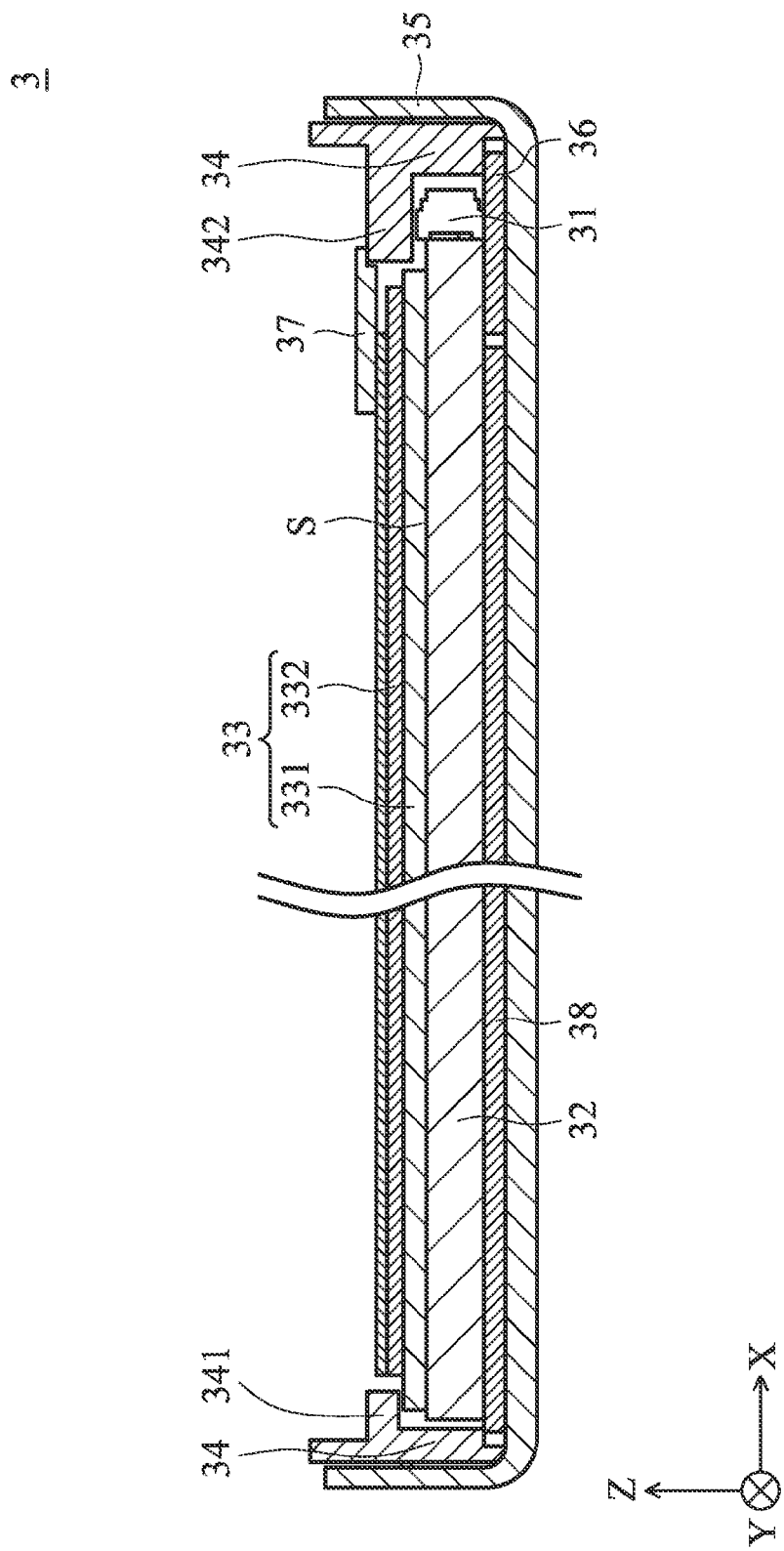
FIG. 3 is a section view of a backlight module in accordance with Embodiment 1 of the invention.

FIG. 3 is a section view of a backlight module in accordance with Embodiment 1 of the invention. When a backlight module in accordance with Embodiment 1 is viewed from the A-A' section of FIG. 1, as shown in FIG. 3, the backlight module 3 comprises a LED light source 31, a light guiding plate 32, an optical film assembly 33, a ring-shaped frame 34, a bezel 35, a printed circuit board 36, a shielding pad 37, and a reflection film 38.

The LED light source 31, the light guiding plate 32, the bezel 35, and the reflection film 38 shown in FIG. 3 are the same as the LED light source 21, the light guiding plate 22, the bezel 25, and the reflection film 28 respectively. Detailed descriptions for those elements are omitted.

In the structure shown in FIG. 3, the ring-shaped frame 34 has an extension portion 341 extending toward the +X direction and an extension portion 342 extending toward the −X direction. Although not shown in FIG. 3, the ring-shaped frame 34 also has an extension portion extending toward the +X direction and an extension portion extending toward the −X direction. The feature of Embodiment 1 of the invention is that the quantum dot enhancement film 331 which is the bottom optical film of the optical film assembly 33 extends toward the −X, +Y, and −Y directions more than the upper optical films 332, such that the extension portion 341 can cover at least three edges of the quantum dot enhancement film 331. At the side where the LED light source 31 is arranged, the extension portion 32 has to cover at least the LED light source 31. Therefore, if the extension portion 32 further extends toward the −X direction, the extension portion 32 is difficult to form and the strength thereof could be reduced. In this regard, the extension portion 342 extends only to the edge of the light guiding plate 32. Thus, the shielding pad 37 is added for further extending from the extension portion 342 toward the −X direction, which stretches across the gap between the optical film assembly 33 and the extension portion 342 and reaches the top of the optical film assembly 33. On the other hand, in cases where the thickness of the backlight module is not increased, the printed circuit board 36 formed below the LED light source 31 can not only increase the possible thickness of the extension portion 342 to increase its strength but also shorten the distance between the quantum dot enhancement film 331 and the LED light source 31.

In this embodiment, the quantum dot enhancement film 331 extends to the bottom of the extension portion 341. Therefore, the region of the light guiding plate 32 at the gap between the extension portion 341 and the optical film assembly 33 is at least coved by the quantum dot enhancement film 331. The blue light emitted from the light guiding plate 32 must pass through at least the quantum dot enhancement film 331 and then be converted to multiple-color-mixed-light which is close to white light. When the display is watched, white light leaks are more acceptable than blue light leaks. At the side where the LED light source 31 is arranged, the shielding pad 37 covers the gap so the blue light doesn't leak from this edge.

Figure 4:
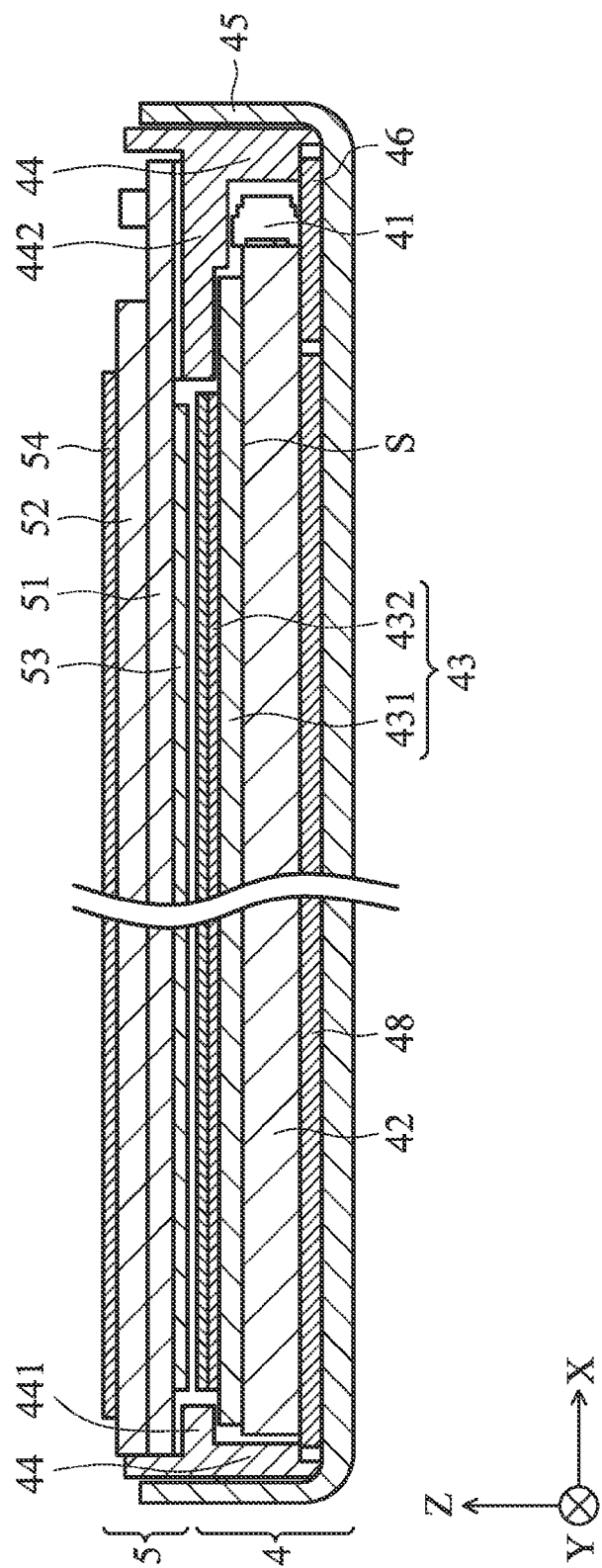
FIG. 4 is a section view of a backlight module and a display panel in accordance with Embodiment 2 of the invention.

FIG. 4 is a section view of a backlight module and a display panel in accordance with Embodiment 2 of the invention. When a backlight module in accordance with Embodiment 2 is viewed from the A-A' section of FIG. 1, as shown in FIG. 4, the backlight module 4 comprises an LED light source 41, a light guiding plate 42, an optical film assembly 43, a ring-shaped frame 44, a bezel 45, a printed circuit board 46, and a reflection film 48. In comparison with FIGS. 2 and 3, FIG. 4 depicts a display panel 5 for showing the structure when the backlight module 4 and the display panel 5 are assembled. The display panel 5 comprises a lower substrate 51, an upper substrate 52, a lower polarizer 53, and an upper polarizer 54. The display panel 5 is placed on the +Z directional surfaces of the extension portions 441 and 442 of the ring-shaped frame 44.

The LED light source 41, the light guiding plate 42, the extension portion 441 of the ring-shaped frame 44, the bezel 45, the printed circuit board 46, and the reflection film 48 in Embodiment 2 are the same as the LED light source 31, the light guiding plate 32, the extension portion 341 of the ring-shaped frame 34, the bezel 35, the printed circuit board 36, and the reflection film 38 in Embodiment 1 respectively. Detailed descriptions for those elements are omitted.

The difference between Embodiments 1 and 2 is that bottom optical film which is the quantum dot enhancement film 431 not only extends toward the −X, +Y and −Y directions but also toward the +X direction more the upper optical films 432. The extension portion 442 of the ring-shaped frame 44 which extends toward the −X direction not only covers the LED light source 41 but also extends to the top of the quantum dot enhancement film 431. Thereby, even at the side where the LED light source 41 is arranged, the region of the light guiding plate 42 at the gap between the extension portion 442 and the optical film assembly 43 is covered by at least the quantum dot enhancement film 431. In this way the blue light emitted from the light guiding plate 42 must pass through at least the quantum dot enhancement film 431 and then be converted to multiple-color-mixed-light which is close to white light.

Furthermore, the ring-shaped frame 34 in Embodiment 1 and ring-shaped frame 44 in Embodiment 2 can adopt a material with a white surface. With the white material having high reflectivity, the ring-shaped frame 34 or 44 reflects light incident to its surface to the quantum dot enhancement film 331 or 431, which reduces the intensity of blue light to increase vision experience.

According to Embodiment 1 and Embodiment 2, by extending only the quantum dot enhancement film which is at the lowest layer of the optical film assembly to the bottom of the extension portion of the ring-shaped frame, the invention prevents blue light leak from the edges of the display and improves vision experience. The entire optical film assembly is not required to extend to the bottom of the extension portion, so the extension portion of the ring-shaped frame doesn't have to be made extremely thin. The yield rate in the manufacturing process can be improved.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
  an illuminant portion having a first surface and emitting light from the first surface, the illuminant portion comprising a light guiding plate and a plurality of light sources arranged along at least one edge of the light guiding plate which guides light emitted from the plurality of light sources to the first surface;
  an optical film assembly placed on the first surface of the illuminant portion and having a quantum dot enhancement film and at least one upper optical film layered above the quantum dot enhance film, the quantum dot enhancement film comprising a first edge and a second edge, wherein the second edge is adjacent to the plurality of light sources; and
  a frame surrounding the illuminant portion and having a first extension portion and a second extension portion extending along a direction parallel to the first surface,
  wherein the quantum dot enhancement film extends toward the frame more than the upper optical film such that the first and second extension portions cover a portion of the quantum dot enhancement film,
  wherein the first extension portion covers the first edge by a first distance and the second extension portion covers the second edge by a second distance, and
  wherein the second distance is greater than the first distance.

2. The backlight module as claimed in claim 1, wherein the frame has a white surface for reflecting light back to the quantum dot enhancement film or the light guiding plate.

3. The backlight module as claimed in claim 1, wherein the plurality of light sources are blue LEDs.

4. The backlight module as claimed in claim 1, wherein the upper optical film is a diffusion film or a micro-lens brightness enhancement film.

5. The backlight module as claimed in claim 1, further comprising:
  a printed circuit board placed on a second surface of the illuminant portion which is opposite to the first surface, for driving the plurality of light sources.

6. A display device, comprising:
  a display panel;
  an illuminant portion having a first surface and emitting light toward the display panel, the illuminant portion comprising a light guiding plate and a plurality of light sources arranged along at least one edge of the light guiding plate;
  an optical film assembly placed on the first surface of the illuminant portion and having a quantum dot enhancement film and at least one upper optical film layered above the quantum dot enhancement film, the quantum dot enhancement film comprising a first edge and a second edge, wherein the second edge is adjacent to the plurality of light sources; and
  a frame surrounding the illuminant portion and having a first extension portion and a second extension portion extending along a direction parallel to the display panel,
  wherein the quantum dot enhancement film extends toward the frame more than the upper optical film such that the first and second extension portions cover a portion of the quantum dot enhancement film,
  wherein the first extension portion covers the first edge by a first distance and the second extension portion covers the second edge by a second distance, and
  wherein the second distance is greater than the first distance.

7. The display device as claimed in claim 6, wherein the illuminant portion emits blue light, and the quantum dot enhancement film converts the blue light into multiple-color-mixed-light which is close to white light.

* * * * *